Feb. 25, 1969

G. CAMAC ET AL 3,429,268

PUMPS

Filed May 4, 1967

INVENTORS:
GEORGE CAMAC
DAVID JOHN SAUNDERS
by Kurt Kelman
AGENT

United States Patent Office 3,429,268
Patented Feb. 25, 1969

3,429,268
PUMPS
George Camac, Worlebury, Weston-super-Mare, and David J. Saunders, Banwell, England, assignors to Speedwell Research Limited, Birmingham, England, a British company
Filed May 4, 1967, Ser. No. 636,057
Claims priority, application Great Britain, May 5, 1966, 19,910/66
U.S. Cl. 103—111                                    5 Claims
Int. Cl. F04d 29/08, 29/40

ABSTRACT OF THE DISCLOSURE

The invention discloses a centrifugal pump having a static seal for controlling leakage between the impeller shaft and the casing when the pump is stationary and a dynamic seal for controlling leakage when the pump is working, the static seal being held inoperative at all times except when the pump is stationary and full of liquid.

Background of the invention

The invention is concerned with centrifugal pumps and in particular with the sealing arrangement between the impeller or inducer shaft of the pump and the casing thereof.

It has previously been proposed to provide a seal for the shaft of a centrifugal pump in a composite form having a dynamic seal operative when the pump is working and a static seal operative when the pump is stationary.

Summary of the invention

The invention provides a construction having a static and dynamic seal in which the seal parts and the casing may be easily assembled. The invention provides a centrifugal pump comprising a casing having a front wall and a rear wall and defining a pump chamber, an inducer shaft passing through an aperture in said rear wall and rotatable within the casing, an inlet in the casing adjacent the axis of rotation of said shaft, an outlet in the casing adjacent the periphery thereof, an inducer mounted on the shaft to establish, when rotated, a flow of liquid within the casing from the inlet to the outlet, a support member releasably secured to the exterior of said rear wall, a seal chamber defined between said support member and said rear wall, an annular rigid separator dividing the seal chamber into first and second parts, the first part being between the second part and the pump chamber, a dynamic seal for controlling leakage between the inducer shaft and the rear wall of the casing when the pump is running, the dynamic seal comprising a subsidiary impeller secured to said shaft and rotatable in the first part of the seal chamber to cause liquid which leaks from the pump chamber past the subsidiary impeller to occupy an annulus in the outer portion of said first part of the seal chamber and to have a pressure such as to inhibit further such leakage, a deflector on the separator adjacent its inner periphery and within the first part of the chamber, the deflector surrounding the central aperture of the separator to prevent liquid flowing across the separator from the first part of the seal chamber to the second part thereof, a static seal for controlling leakage between the inducer shaft and the rear wall of the casing when the pump is stationary, the static seal comprising an annular diaphragm in the second part of the seal chamber secured to the casing and arranged to cooperate with the seating on the shaft to prevent leakage from said second part of the seal chamber and a recess at the outer periphery of the seal chamber and defined between the rear wall and the support member, the outer peripheries of the separator and the diaphragm being located and gripped in said recess, the diaphragm having a rest position clear of the seating but being forced, when the pump is stationary and full of liquid, into contact with the seating by the static pressure of the liquid in the pump, the diaphragm being so located that, when the pump is running and said annulus has been formed, the diaphragm is in a liquid-free zone in the first part of the seal chamber and thus assumes its rest position.

By "rest position" of the diaphragm we mean the position taken up by the diaphragm when the pump is empty and stationary.

Brief description of the drawing

The invention will now be described by way of example with reference to the accompanying drawings, in which.

Description of preferred embodiments

Figure 1:
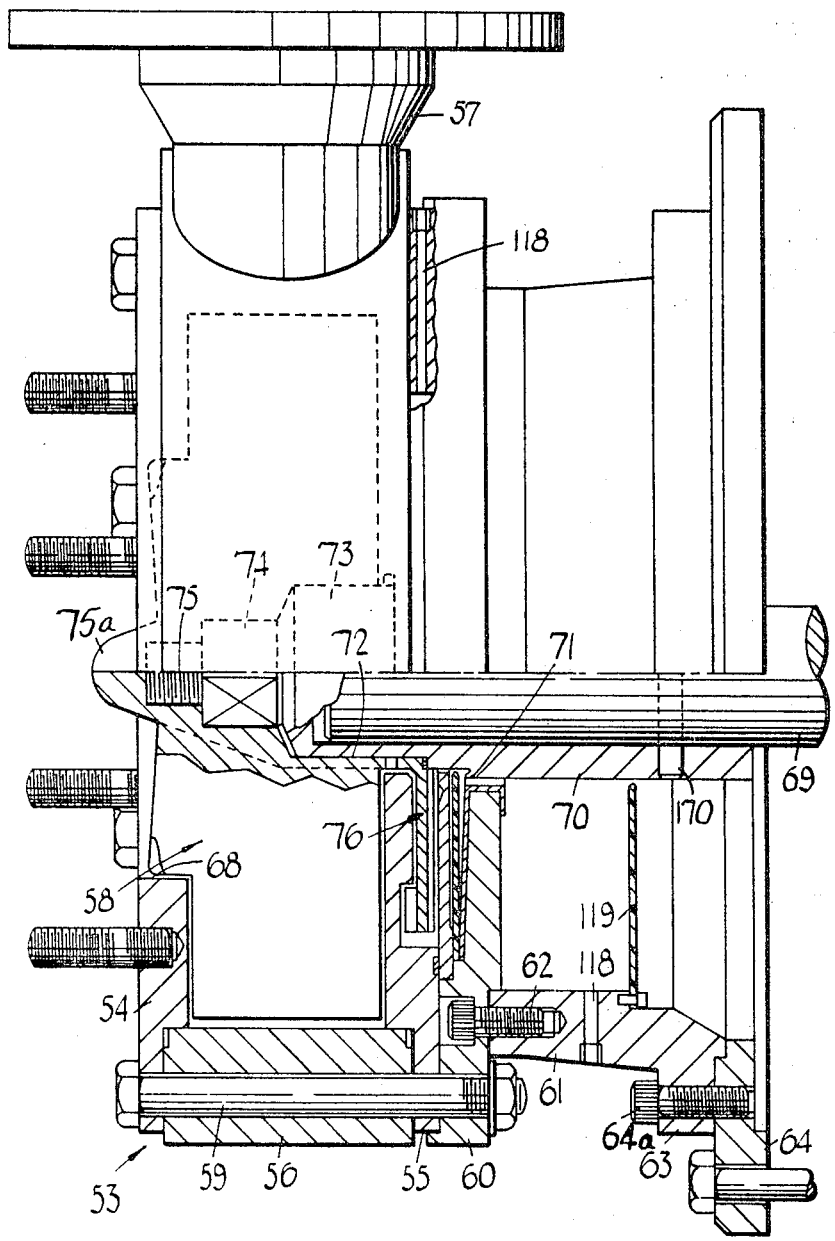
FIGURE 1 is a side elevation, partly in section, of a pump embodying the invention.
Figure 2:
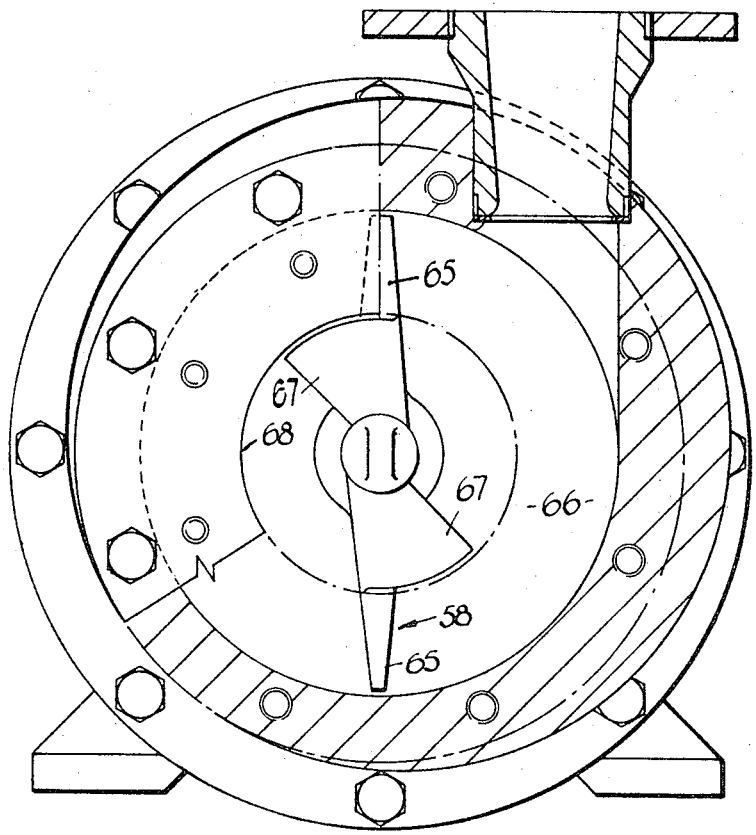
FIGURE 2 is an end elevation of the pump of FIGURE 1 partly in section.
Figure 3:
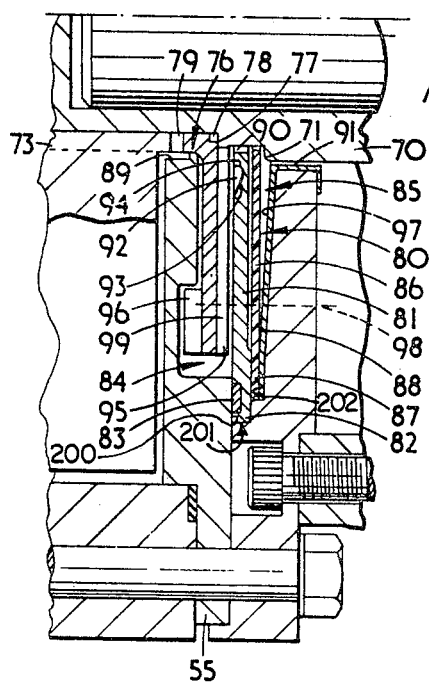
FIGURE 3 is a view on a larger scale of part of FIGURE 1 showing the sealing arrangement of the pump.

Referring to FIGURES 1 to 3, the pump comprises a casing indicated generally at 53 having a front wall 54, a rear wall 55, a peripheral wall 56 in the form of a ring, an outlet 57 screwed into the peripheral wall and an inducer 58. The walls 54, 55 and 56 are held together by bolts 59 which pass through all the walls and also through a forward casting 60. The forward casting 60 is connected to a rear casting 61 by socket headed screws 62 and the rear casting 61 has a flange 63 which is connected to a motor ring 64 by screws 64a.

The inducer 58 has blades 65 rotating in the pump chamber 66 provided in the casing and has two blade horns 67 rotating in the central aperture 68 of the front wall 54 and which help to prevent cavitation.

The shaft of an electric motor is indicated generally at 69 and carries a sleeve 70 which is secured to the shaft by means of a taper pin 170. The sleeve 70 is provided with a shoulder 71 which provides a seal seating as will hereinafter be described and a cylindrical portion 72 which receives the hub portion 73 of the inducer. The sleeve has a squared portion 74 which is received in a corresponding squared aperture in the inducer and a threaded portion 75 which receives a bullet 75a which holds the inducer on the sleeve. The sleeve also carries a subsidiary impeller indicated generally at 76 and shown in detail in FIGURE 3. The subsidiary impeller fits on a shoulder 77 on the sleeve and a gasket 78 is trapped between the subsidiary impeller and the shoulder. The subsidiary impeller 76 and the inducer hub portion 73 are formed with complementary dogs indicated at 79 which engage so that the inducer drives the subsidiary impeller 76.

Referring particularly to FIGURE 3, defined between the rear wall 55 of the casing and the front casting or support member 60 is a seal chamber indicated generally at 80. The seal chamber is divided into two parts by means of an annular separator 81 whose outer periphery 82 is trapped in the first part 200 of a stepped recess 201 defined between the casting 60 and the rear wall 55. A sealing gasket 83 is interposed between the separator 81 and the wall 55. The first part of the seal chamber is indicated generally at 84 and contains the subsidiary impeller 76. The second part of the seal chamber is indicated generally at 85 and contains a flexible diaphragm 86. The outer periphery of the flexible diaphragm indicated at 87 is trapped in a second part 202 of the recess 201 between the separator 82 and the forward casting 60. The forward casting is shown in this instance as lined with a titanium sheet 88 which is required if the pump is used for pumping corrosive liquids and, the front wall, the rear wall and peripheral wall may be made of titanium.

The sleeve 70 passes with clearance through a central aperture 89 in the rear wall 55 of the casing and there is a clearance 90 between the inner periphery of the separator 81 and the sleeve 70. There is also a clearance 91 between the inner edge of the forward casting 60 where sheathed with the titanium plate 88 and the sleeve 70. The diaphragm 86 is shown in FIGURE 3 in its normal position of rest.

A deflector in the form of a groove 92 is provided in the surface of the separator 81 which faces the first part 84 of the seal chamber, the groove being located at the inner periphery of the separator and thus adjacent to the clearance 90. The groove has an outer surface 93 which slopes at a lesser angle of inclination to said surface of the separator 88 than does the inner side 94 of the groove. The subsidiary impeller 76 is provided with blades 95 on its surface adjacent the separator 81, such blades extending substantially for the whole radial width of the impeller and the impeller is also provided with shorter blades 96 on its opposite surface which extend only for an outer part of the radial dimension of the subsidiary impeller.

The operation of the seal is as follows. Assuming that the pump is empty and it is stationary then the diaphragm 86 will assume the position shown in FIGURE 3 so that its inner edge is clear of the seating constituted by the shoulder 71. If the pump, now remaining stationary, now fills with liquid, the liquid will pass from the inlet 68, through the pump chamber 66, through the central aperture 89 in the rearwall 55 of the pump casing, around the subsidiary impeller and through the first part 84 of the seal chamber, through the clearance 90 at the inner periphery of the separator 81 and will then deflect the diaphragm 86 so that its inner periphery comes into contact with the shoulder 71 thus providing a seal. It will be seen that the wall 97 of the second part 85 of the seal chamber is slightly conical so as to support the diaphragm 86 when it is in its sealing position with its inner periphery in contact with the seating constituted by the shoulder 71. This assists the diaphragm in resisting a high pressure to which it can be exposed if two pumps are connected to the same discharge manifold, one of the pumps being stationary and being subjected to the delivery pressure of the other pump.

If the pump, now being full, is started, the subsidiary impeller 76 will pump liquid out of the second part 85 of the seal chamber and will form between the blades 95 and the separator 86, an annulus of liquid so that the liquid air interface will be at the position indicated by the dotted line 98. It will be seen, therefore, that the separator 86 will isolate the diaphragm 86 from the pressure of the liquid in this annulus and, as a result, the diaphragm will be in a liquid-free zone and will be able to assume its free position as shown in the drawing clear of the seating provided by the shoulder 71. While the pump is running, therefore, the diaphragm is clear of the seating and no undue wear will take place. It is found in operation that some liquid may tend to trickle across the surface 99 of the separator and any liquid which does trickle over such surface is caught in the groove 92 and is returned to the annulus. The blades 95 on the subsidiary impeller produce the requisite pressure to seal against a super-atmospheric head while the blades 96 on the impeller serve to seal against a sub-atmospheric head. It will be seen that with this arrangement, the pump can be run dry without wearing the diaphragm 86 since the inner periphery thereof is out of contact with the seating constituted by the shoulder 71 on the shaft sleeve.

Figure 4:
FIGURE 4 is a detailed view showing an alternative form of deflector for the separator plate as shown in FIGURES 1 and 3.

Referring to FIGURE 4, the groove 92 could be replaced by a peripheral rib as shown in this figure, the inner edge of a separator being indicated at 81a and a rib at the inner edge thereof being indicated at 102 thus providing a deflector to prevent liquid passing through the clearance 90 between the central aperture of the separator and the sleeve 70.

If desired, the seal may be flushed in use and for this purpose, referring to FIGURE 1, there is provided a flushing conduit 118 which is formed partly in the rear wall 55 of the pump casing and partly in the casting 60 and allows liquid to be flushed through the first part 84 of the seal chamber to prevent crystallisation in the chamber should this be necessary. The flushing circuit is provided with a non-return valve so that a pressure cannot build up in the seal chamber to cause the diaphragm 81 to contact its seating constituted by the shoulder 71. The casting 61 may be provided with a drain 118 and with a diaphragm 119 to prevent excess leakage should the seal fail for any reason, the clearance between the inner end of the diaphragm 119 and the sleeve being of the order of 10 to 20 thousandths of an inch. The diaphragm 119 can conveniently be made of Tufnol (trademark).

The diaphragms constituting the static seals in the various arrangements may be made from any suitable flexible material but are preferably made from polytetrafluorethyene with or without a loading of carbon.

We claim:

1. A centrifugal pump comprising a pump casing having a front wall and a rear wall and defining a pump chamber, an inducer shaft passing through an aperture in said rear wall and rotatable within the casing, an inlet in the casing adjacent the axis of rotation of said shaft, an outlet in the casing adjacent the periphery thereof, an inducer mounted on the shaft to establish, when rotated, a flow of liquid within the casing from the inlet to the outlet, a support member releasably secured to the exterior of said rear wall, a seal chamber defined between said support member and said rear wall, an annular rigid separator dividing the seal chamber into first and second parts, the first part being between the second part and the pump chamber, a dynamic seal for controlling leakage between the inducer shaft and the rear wall of the casing when the pump is running, the dynamic seal comprising a subsidiary impeller secured to said shaft and rotatable in the first part of the seal chamber to cause liquid which leaks from the pump chamber past the subsidiary impeller to occupy an annulus in the outer portion of said first part of the seal chamber and to have a pressure such as to inhibit further such leakage, a deflector on the separator adjacent its inner periphery and within the first part of the seal chamber, the deflector surrounding the central aperture of the separator to prevent liquid flowing across the separator from the first part of the seal chamber to the second part thereof, a static seal for controlling leakage between the inducer shaft and the rear wall of the casing when the pump is stationary, the static seal comprising an annular diaphragm in the second part of the seal chamber secured to the casing and arranged to cooperate with the seating on the shaft to prevent leakage from said second part of the seal chamber, and a recess in the outer periphery of the seal chamber and defined between the rear wall and the support member, the outer peripheries of the separator and the diaphragm being located and gripped in said recess, the diaphragm having a rest position clear of the seating but being forced, when the pump is stationary and full of liquid, into contact with the seating by the static pressure of the liquid in the pump, the diaphragm being so located that, when the pump is running and said annulus has been formed, the diaphragm is in a liquid free zone in the first part of the seal chamber and thus assumes its rest position.

2. A centrifugal pump according to claim 1 including a gasket interposed between the outer periphery of the separator and said rear wall.

3. A centrifugal pump according to claim 1 wherein the recess has two parts, a first cylindrical part of larger diameter bounded by said rear wall and containing the outer periphery of the separator and a second cylindrical part opening from said first cylindrical part, said second cylindrical part having a smaller diameter than the first part, lying wholly within said support member and containing the outer periphery of the diaphragm.

4. A pump according to claim 1 wherein the separator is in the form of a flat plate and wherein the deflector comprises an annular rib which projects from the surface of the separator within said first part of the seal chamber.

5. A pump according to claim 1 wherein the separator is in the form of a flat plate and the deflector comprises an annular groove in the plate.

References Cited

UNITED STATES PATENTS

| 2,622,902 | 12/1952 | Malmvik | 277—13 |
| 2,873,986 | 2/1959 | Murray. | |

FOREIGN PATENTS

| 150,669 | 3/1953 | Australia. |
| 719,353 | 4/1942 | Germany. |
| 896,481 | 5/1962 | Great Britian. |

HENRY F. RADUAZO, *Primary Examiner.*

U.S. Cl. X.R.

277—88